US012422286B1

(12) United States Patent  
Tucker et al.

(10) Patent No.: US 12,422,286 B1
(45) Date of Patent: Sep. 23, 2025

(54) FLOW METER

(71) Applicant: VACUUM TECHNOLOGIES, LLC, Sheridan, WY (US)

(72) Inventors: John F. Tucker, Sheridan, WY (US); Clay D. Price, Sheridan, WY (US); Justin Taylor Heaps, Ranchester, WY (US)

(73) Assignee: Vacuum Technologies, LLC, Sheridan, WY (US)

( * ) Notice: Subject to any disclaimer, the term of this patent is extended or adjusted under 35 U.S.C. 154(b) by 211 days.

(21) Appl. No.: 18/099,728

(22) Filed: Jan. 20, 2023

Related U.S. Application Data

(60) Provisional application No. 63/301,199, filed on Jan. 20, 2022.

(51) Int. Cl.
*G01F 1/44* (2006.01)
*G01F 1/36* (2006.01)

(52) U.S. Cl.
CPC ................ *G01F 1/44* (2013.01); *G01F 1/363* (2013.01)

(58) Field of Classification Search
CPC . G01F 1/36; G01F 1/363; G01F 1/366; G01F 1/40; G01F 1/44; G01F 15/14; G01F 15/18; G01F 15/185; G01D 11/24; G01D 11/245

See application file for complete search history.

(56) References Cited

U.S. PATENT DOCUMENTS

| | | | | |
|---|---|---|---|---|
| 1,697,344 A | * | 1/1929 | Campbell | G01F 1/36 138/44 |
| 2,112,441 A | * | 3/1938 | Lewis | G01F 1/386 417/43 |
| 3,130,586 A | * | 4/1964 | Taylor | G01F 1/40 73/725 |
| 4,787,254 A | * | 11/1988 | Duckworth | G01F 1/42 73/861.62 |
| 5,483,838 A | * | 1/1996 | Holden | G01L 19/0007 73/861.52 |

FOREIGN PATENT DOCUMENTS

JP 2004003887 A * 1/2004

OTHER PUBLICATIONS

"Water Meters" by B & B electrical as downloaded by the Internet Archive Wayback Machine on Jun. 11, 2019; Website address: https://web.archive.org/web/20190611011202/https://bbelec.com/product/water-meters/.*

* cited by examiner

*Primary Examiner* — Justin N Olamit
(74) *Attorney, Agent, or Firm* — Nyemaster Goode P.C.

(57) ABSTRACT

An air pressure-based flow meter assembly for a vacuum hose of a vehicle vacuuming system capable of measuring static pressure and dynamic pressure that includes a cover having an upstream end with an upstream cover opening and a downstream end with a downstream cover opening, a venturi insert disposed within and coupled to the cover, and a flow meter engaged with the cover and attached to the venturi portion of the venturi insert such that the flow meter is in airflow contact with the venturi portion.

20 Claims, 10 Drawing Sheets

FLOW METER

CROSS-REFERENCE TO RELATED APPLICATION

This application claims benefit of and priority to U.S. Application Ser. No. 63/301,199, filed on Jan. 20, 2022, entitled "FLOW METER," the entire disclosure of which is hereby incorporated herein by reference.

BACKGROUND

The ability to quickly, efficiently, and accurately measure the performance of a vacuum system, in particular a vehicle vacuuming system having a single or multiple vehicle vacuuming locations, at a vacuum hose actually used or at each of a set of hoses in a vacuum system is important to understanding how the entire vacuum system is functioning and important to easily show a user or vacuum facility manager or owner that there is proper airflow at the actual vacuum hose inlet or inlets. Previously, the performance and specification of a vacuum system was given in terms of horsepower of the vacuum system's motor, as well as the size of the vacuum system's motor. However, these details do not give an accurate insight into the amount of airflow through a vehicle vacuum system at the actual point of use, especially a vehicle vacuum system with multiple vacuuming locations and inlets that may be performing differently based on their distance from the vacuum source. As such, traditional horsepower and size information is not as accurate or useful to customers and owners to judge actual airflow force at the inlet.

SUMMARY

One aspect of the present disclosure generally includes a pressure-based flow meter for a vacuum hose that includes a cover having upstream and downstream ends, and a venturi insert within the cover, the venturi insert having a nozzle portion, a diffuser portion, and a venturi portion between the nozzle portion and the diffuser portion. A meter assembly is coupled to the cover and attached to the venturi portion of the venturi insert, the meter assembly comprising an airflow rate meter, a static pressure meter, and a pressure sensor. The meter assembly is configured to display an airflow rate by sensing the dynamic pressure through the venturi portion when airflow is urged through the venturi insert, and display a static pressure reading by sensing the static pressure within the venturi insert when the upstream end of the flow meter is closed.

Another aspect of the present disclosure is generally directed toward a method of determining the performance characteristics of a vacuum hose by attaching a flow meter having an upstream end, a downstream end, and a venturi insert to a vacuum hose and obtaining an airflow reading. The airflow reading step includes urging an airflow through an upstream end of the venturi insert, increasing the velocity of the airflow by urging the airflow through a nozzle portion of the venturi insert, urging the airflow through a venturi portion of the venturi insert, decreasing the velocity of the airflow by urging the airflow through a diffuser portion of the venturi insert, allowing the airflow to exit the venturi insert into the vacuum hose, sensing the dynamic pressure of the air at the venturi portion using a pressure sensor, and displaying the airflow reading by translating the sensed dynamic pressure into the airflow reading on a visible meter assembly. A static pressure reading is obtained by closing the upstream end of the flow meter, sensing the static pressure of the air at the venturi portion using the pressure sensor, and displaying the pressure reading on the visible meter assembly.

Yet another aspect of the present disclosure is generally directed to a flow meter, typically an air pressure-based flow meter assembly for a vacuum hose of a vehicle vacuuming system capable of measuring static pressure and dynamic pressure, that includes a cover having an upstream end with an upstream cover opening and a downstream end with a downstream cover opening; a venturi insert disposed within and coupled to the cover, the venturi insert having an venturi upstream end and a venturi downstream end, a nozzle portion adjacent the venturi upstream end, a diffuser portion adjacent the venturi downstream end, and a venturi portion between the nozzle portion and the diffuser portion; and a flow meter engaged with the cover and attached to the venturi portion of the venturi insert such that the flow meter is in airflow contact with the venturi portion. The flow meter typically includes an airflow rate meter, a static pressure meter, and a pressure sensor. The flow meter typically displays an airflow rate by sensing dynamic pressure through the venturi portion when airflow is urged through the venturi insert and a static pressure reading by sensing the static pressure within the venturi insert when the upstream end of the flow meter is closed.

Another aspect of the present disclosure is generally directed to a flow meter, typically an air pressure-based flow meter assembly, that typically includes: a cover having an upstream end with an upstream cover opening, a downstream end with a downstream cover opening, a first leg on a bottom surface of the cover, and a second leg on the bottom surface of the cover spaced apart from the first leg where the first leg is proximate the upstream end of the cover and the second leg is proximate the downstream end of the cover; a venturi insert disposed within and coupled to the cover, the venturi insert having a venturi upstream end and a venturi downstream end, a nozzle portion adjacent the venturi upstream end, a diffuser portion adjacent the venturi downstream end, and a venturi portion between the nozzle portion and the diffuser portion; and a flow meter engaged with the cover and attached to the venturi portion of the venturi insert such that the flow meter is in airflow communication with the venturi portion. The flow meter typically displays an airflow rate by sensing dynamic pressure through the venturi portion when airflow is urged through the venturi insert. The flow meter displays a static pressure reading by sensing the static pressure within the venturi insert when the upstream end of the flow meter is closed. The upstream end of the cover typically has a plurality of spaced apart venturi insert engaging protrusions on an interior facing surface of the upstream end and the venturi upstream end of the venturi insert has a plurality of spaced apart cover attachment protrusions thereon that engage the venturi insert engaging protrusions such that a line-to-line fit or an interference fit is created therebetween. The cover further typically has an upstanding meter boss and the flow meter is coupled to the cover and spaced within the upstanding meter boss. The venturi insert is typically substantially concentric with a center of the upstream cover opening and the downstream cover opening and wherein the venturi insert further includes a venturi insert upstream end opening and a venturi insert downstream end opening and wherein the venturi insert upstream end opening and the venturi insert downstream end opening have the same cross-sectional size.

Another aspect of the present disclosure is generally directed to a method of determining performance characteristics of at least one vacuum hose of a vehicle vacuuming system that includes the steps of: attaching a flow meter assembly of the present disclosure to a first vehicle vacuuming hose; and performing one or more of the following steps for the first vehicle vacuuming hose: obtaining a dynamic pressure reading by activating a motor of the vehicle vacuuming system such that an airflow is established from an ambient environment around the flow meter assembly such that air flows in series through an upstream end of the venturi insert, through a nozzle portion of the venturi insert, through a venturi portion of the venturi insert, and through a diffuser portion of the venturi insert and out the downstream opening of the flow meter; using the flow meter of the sensing the dynamic pressure of the air at the venturi portion using a pressure sensor; and displaying the airflow reading by translating the sensed dynamic pressure into the airflow reading on a visible meter assembly; obtaining a static pressure reading by: closing the upstream end of the flow meter; sensing a static pressure of the air at the venturi portion using the pressure sensor; and displaying the static pressure reading on the visible meter assembly.

These and other aspects, objects, and features of the present disclosure will be understood and appreciated by those skilled in the art upon studying the following specification, claims, and appended drawings.

DETAILED DESCRIPTION

Figure 1:
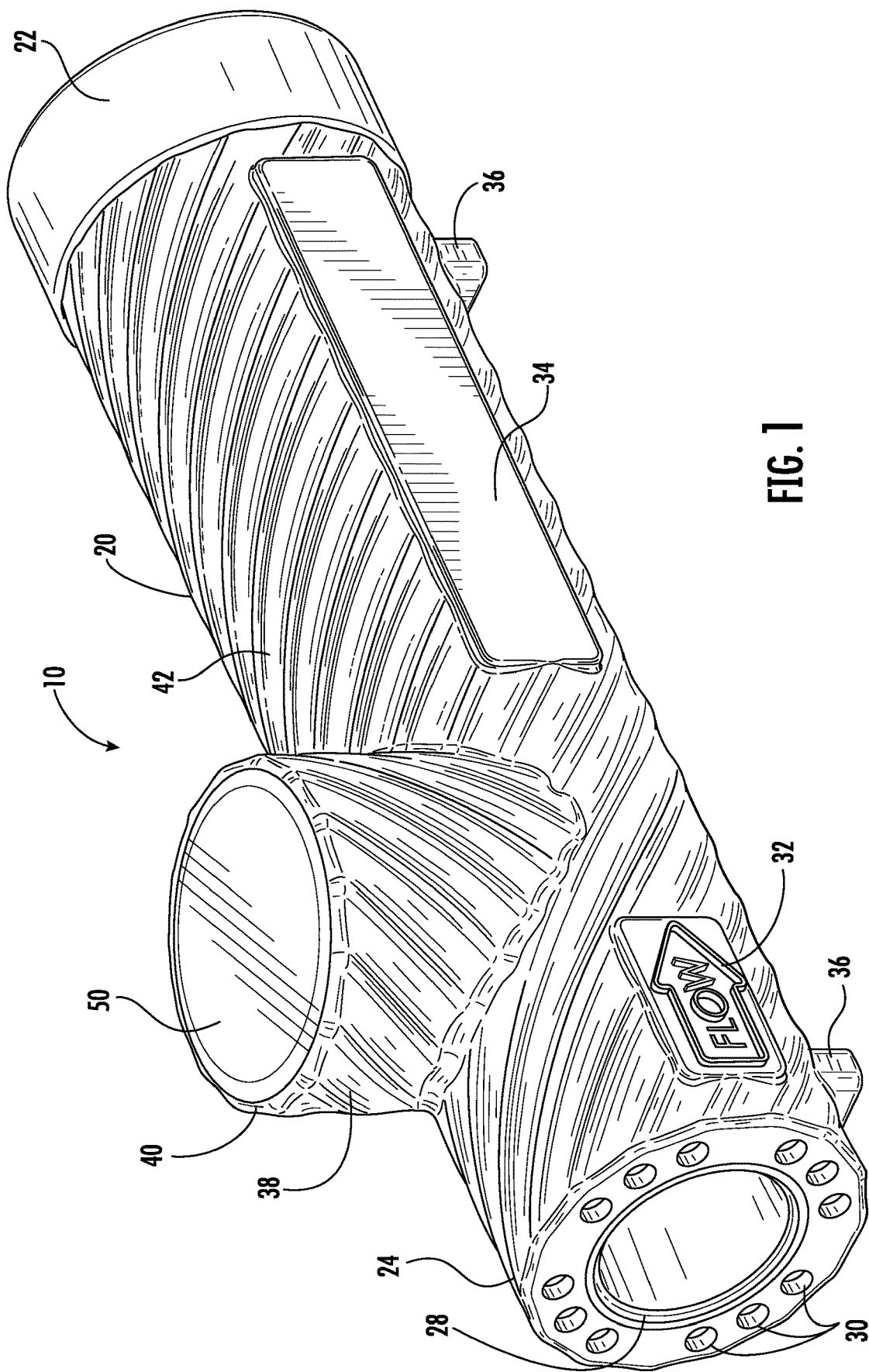
FIG. 1 is an isometric view of a flow meter of an embodiment.
Figure 2:
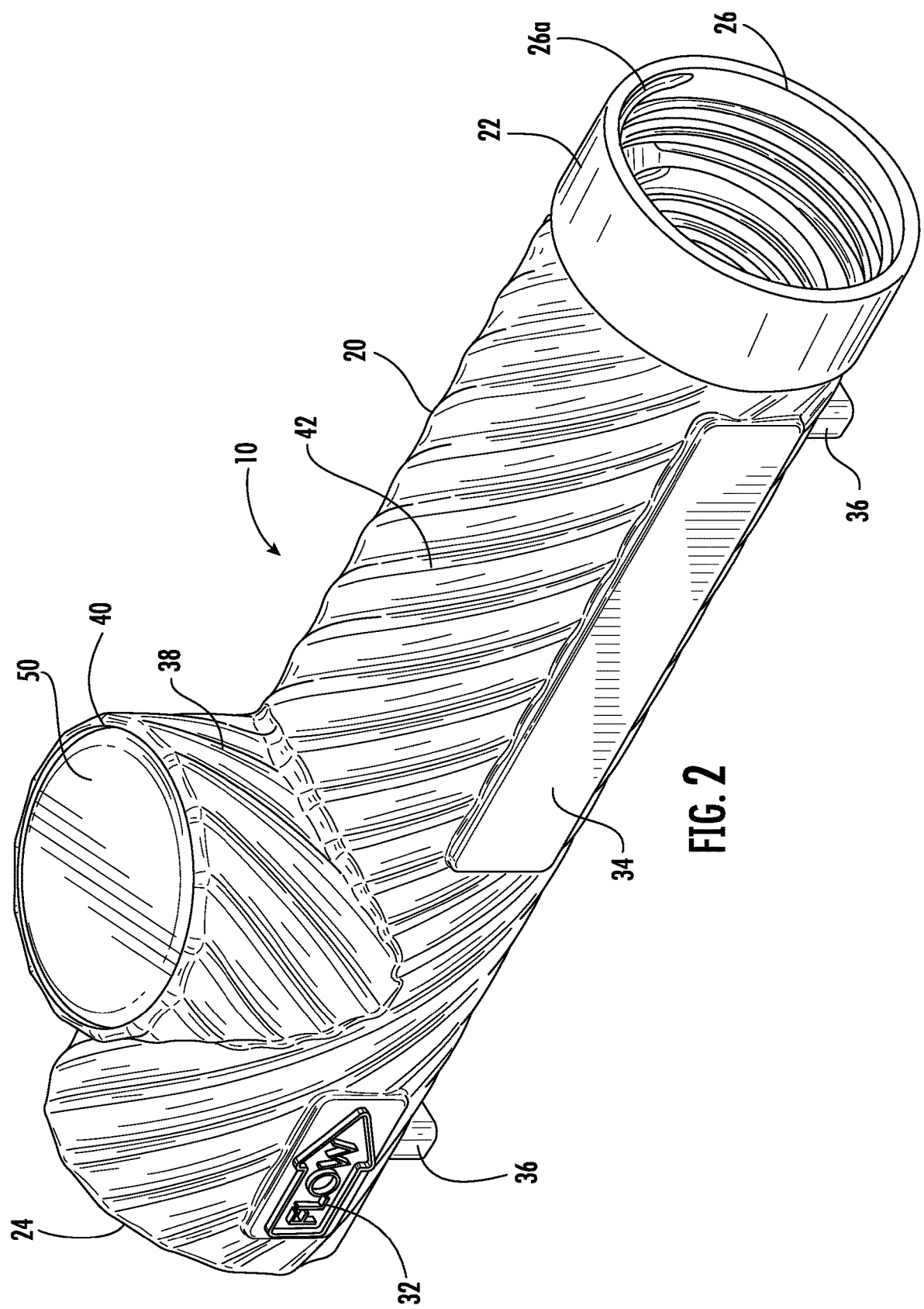
FIG. 2 is another isometric view of a flow meter of an embodiment.
Figure 3:
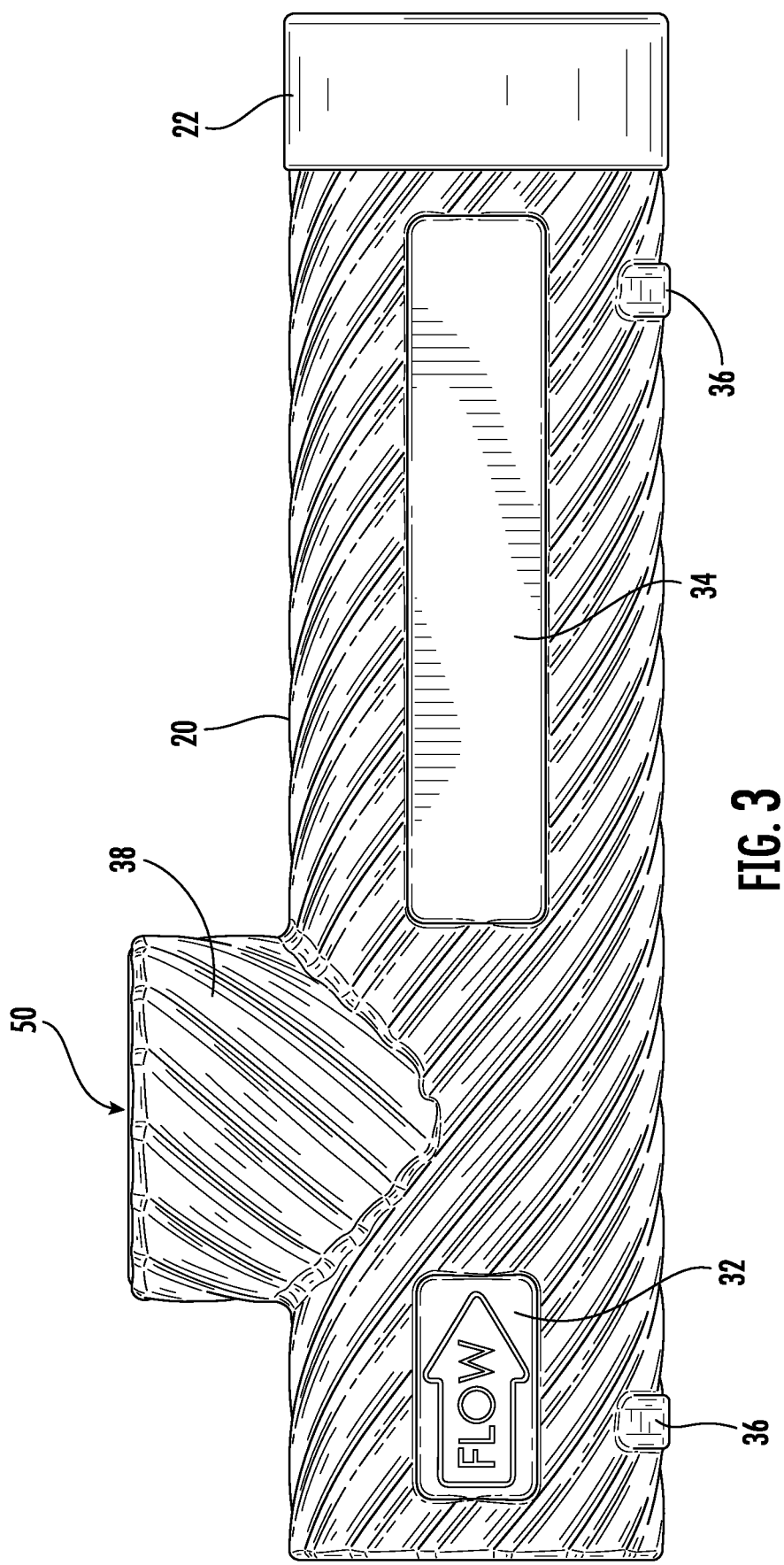
FIG. 3 is a front view of a flow meter of an embodiment.
Figure 4:
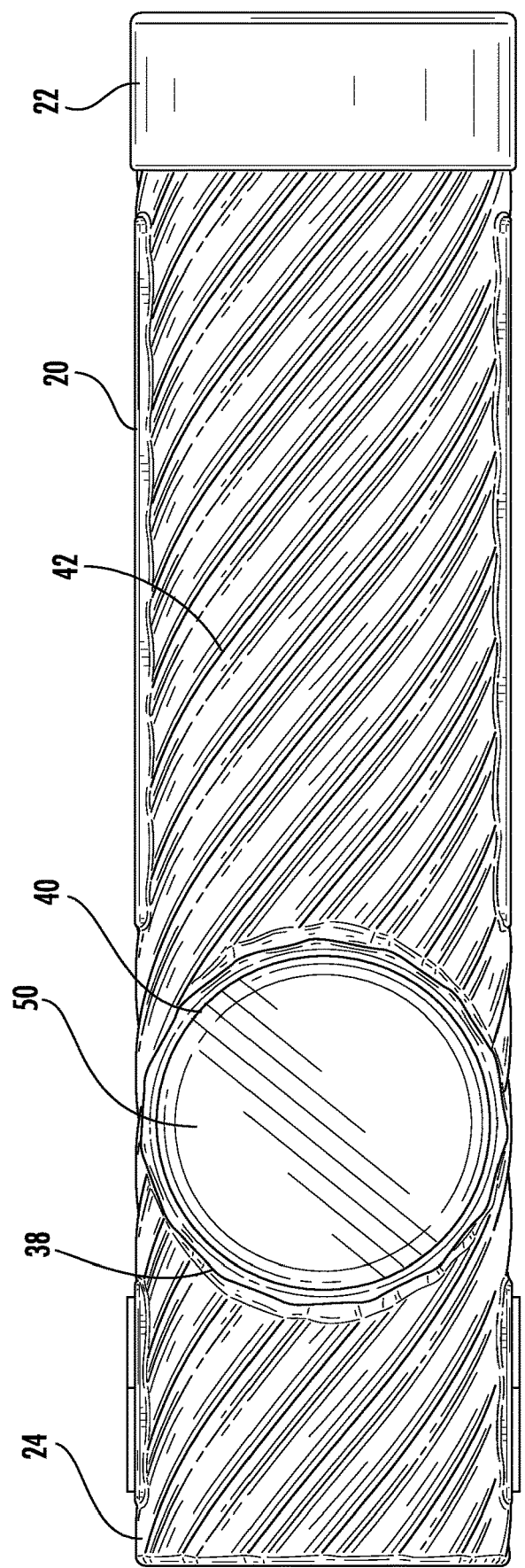
FIG. 4 is a top view of a flow meter of an embodiment.
Figure 5:
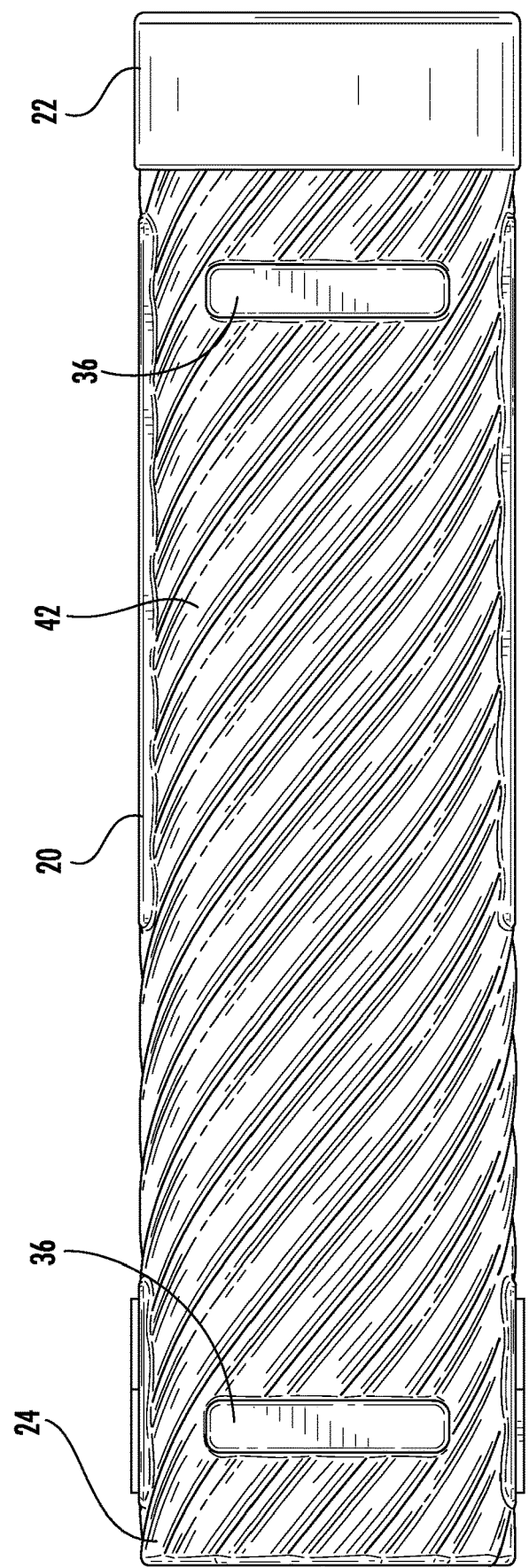
FIG. 5 is a bottom view of a flow meter of an embodiment.
Figure 6:
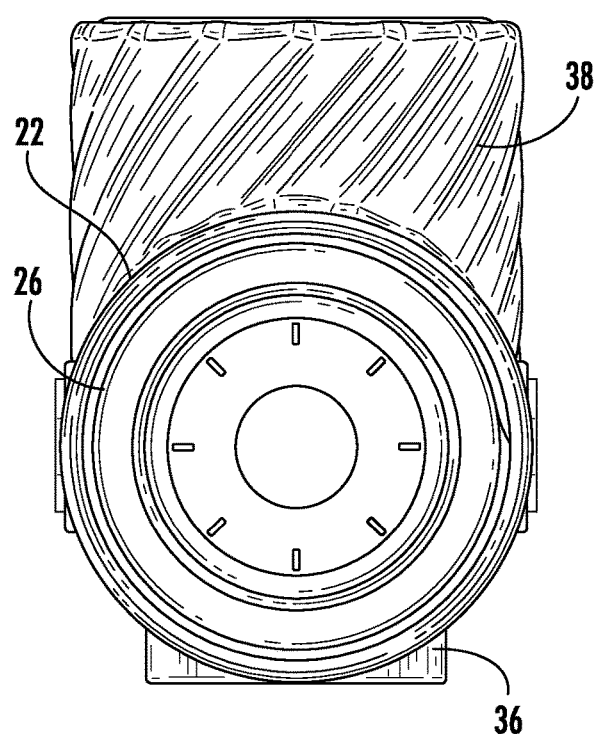
FIG. 6 is a right-side view of a flow meter of an embodiment.
Figure 7:
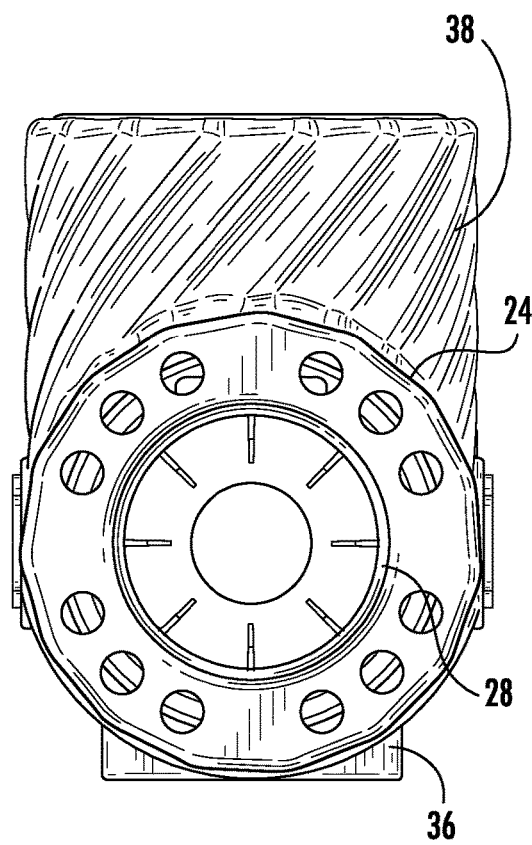
FIG. 7 is a left-side view of a flow meter of an embodiment.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Generally disclosed is a tool that typically a maintenance, owner, sales person, or installer can use to quickly and quantitatively evaluate and/or demonstrate the performance and effectiveness of a single vacuum hose at its air inlet. Typically, the tool will be used to show the actual airflow speed of air entering the system at the vacuum system inlet being tested to show that adequate or surplus airflow strength is available to the user at that location of the vacuum system whether that system is a single or dual intel canister system or a centrally located vacuum system with a plurality of inlet locations located further downstream from the vacuum air supply source. When tested across an entire system of hoses at a car wash facility, the flow meter assembly of the present disclosure makes it easy and quick to test the performance of a system, allowing a knowledge expert to educate a customer, user, owner or another person and communicate in quantitative terms of how a vacuum system actually delivers customer experience at each air inlet that will be used by the customer as opposed to simply referring to the size of an electric motor on the system or pseudo use claims of how many vacuum stalls a particular vacuum producer can effectively operate.

Looking at FIGS. 1-7, the flow meter assembly 10 has a generally tubular shape, including a substantially cylindrical cover 20. The cover 20 includes a first end or downstream end 22 that engages the airflow inlet of the systems being tested, and a second end/an upstream end 24 that receives ambient air. A direction of flow indicator 32 may be included on or integrally formed in the cover 20 or any other portion of the flow meter assembly 10 that gives an easy indication to the user of the intended direction of flow. The substantially cylindrical cover is typically an injection molded plastic material.

There may be a second information indicator 34 on the side of the cover 20 to display manufacturing information, direction for use, source identifiers, calibration information, a QR code to direct the user to instructional information via a mobile computing device or any other information or combination of the above information that a user may find valuable to have on the flow meter assembly 10 itself.

Figure 10:
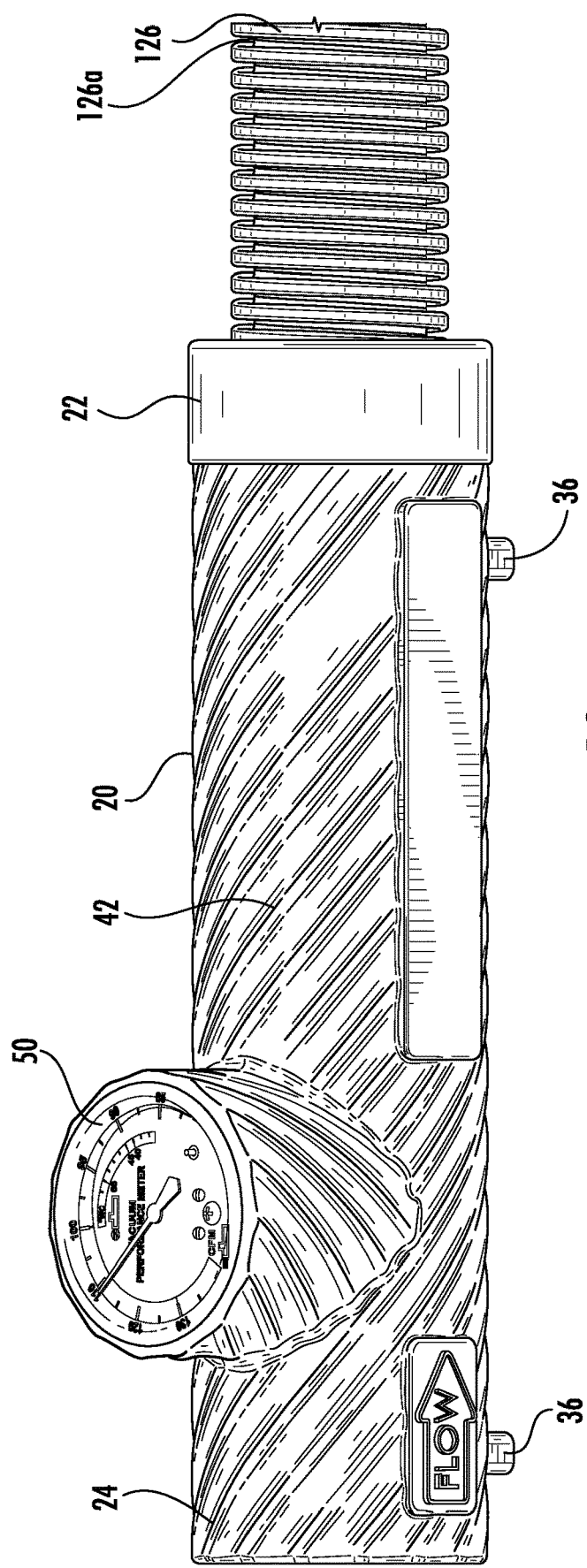
FIG. 10 is a front elevated view of the flow meter of an embodiment attached to a typical vacuum hose.

The downstream end 22 has an opening 26 (FIG. 2) that is typically configured to attach to a vacuum hose. The attachment as shown, includes male threads 26a that are configured to couple with a typical 1.5" vacuum hose 126 with corresponding female threads 126a (see FIG. 10). However, the internal diameter of the cover 20 can be varied such that a user can attach the flow meter assembly to a 2" vacuum hose as well. This allows the user to easily attach the flow meter assembly 10 to the vacuum hose 126 for the flow test.

The upstream end 24 may include an opening 28. Additional openings 30 may be placed around the opening 28 for ease of manufacturing and are typically spaced in groupings of two or three or four with a break therebetween as shown in FIG. 1, but are typically spaced evenly around the perimeter lip extending inwardly from the exterior surface 42 of the cover and defining the opening 28. The opening 28 may be sized to match the opening 78 at the second or upstream end 74 of the venturi insert 70 (see, for example, FIG. 8).

A pair or a plurality of legs 36 of other downwardly facing supports may be attached to or integrally formed as part of the cover 20 on the bottom of the cover. The legs may be included to prevent the flow meter assembly 10 from rolling around on a surface when in use or not in use, but could be any shape or in any number. As shown, the legs 36 are molded into the cover 20 and span across the width of the underside. Multiple legs of any shape and size may be added for support to prevent unwanted rotation of the overall flow meter assembly and may be attached to the cover by any method known in the art. Conceivably, the cover's exterior could be cubical in cross-section, but the openings would typically remain round to engage the venturi insert such that there is a mating engagement therewith as illustrated in the figures of the present disclosure.

Figure 8:
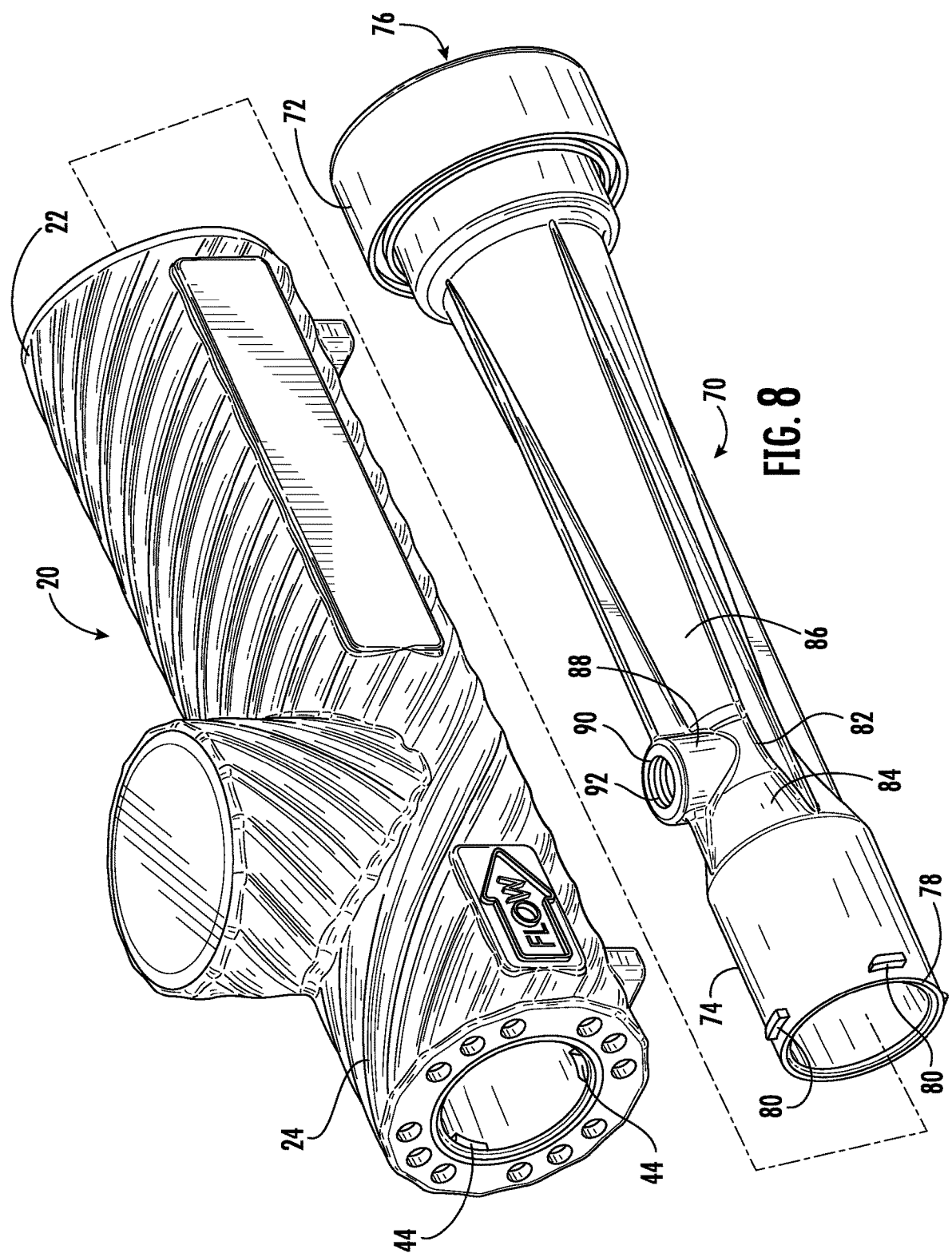
FIG. 8 is an exploded view of the cover and the venturi insert of an embodiment.

Coupled to and within the cover 20 is a venturi insert 70 (see FIG. 8). The venturi insert 70 is generally cylindrical to fit within the cover 20, but includes non-cylindrical portions between a downstream or first end 72 and an upstream or second end 74. The upstream end 74 and downstream end 72 may include openings 78 and 76, respectively. The openings 76, and 78 are typically substantially identical in cross-sectional area so as to sense the most accurate pressure as possible within the flow meter 50. Between the ends 72, 74 and in the direction of flow there may be a nozzle section 84 that leads to a venturi section where the pressure is sensed, which in turn leads to a diffuser section 86 that allows a gradual change in cross-sectional area from the venturi section to the downstream end 72. The end 72 typically has an exterior shape and size that substantially matches the interior surface of the cover so that when the venturi insert is positioned within the housing the interior surface of the cover engages an exterior surface of a portion of the venturi insert that is proximate the end 72. This portion is typically substantially cylindrically shaped because the interior surface of the cover is typically cylindrically shaped to allow for the venturi section to be installed within the interior of the cover by hand and without the use of tools. Tools could conceivably be used to engage the cover and the venturi insert.

Extending upwardly from the venturi section 82 is a meter connection boss 88. The meter connection boss 88 may include a meter opening 90. The meter opening 90 may include threads 92 that allows the flow meter 50 to couple securely to the venturi insert 70. The second end 74 may include cover attachment protrusions 80. The cover attachment protrusions 80 may rotatably slide within receiving protrusions 44 on the inner surface of the cover 20. The fit between the cover attachment protrusions 80 and the receiving protrusions 44 may be a line-to-line fit or a slight interference to securely hold the venturi insert 70 and the cover 20 together.

The first end 72 outside diameter may match the inner diameter of the first downstream end 22 of the cover 20, while the opening 76 of the first end is set back from the male threads 26a of the cover and is sized to match the inner diameter of the hose the flow meter assembly 10 is attaching to.

Figure 9:
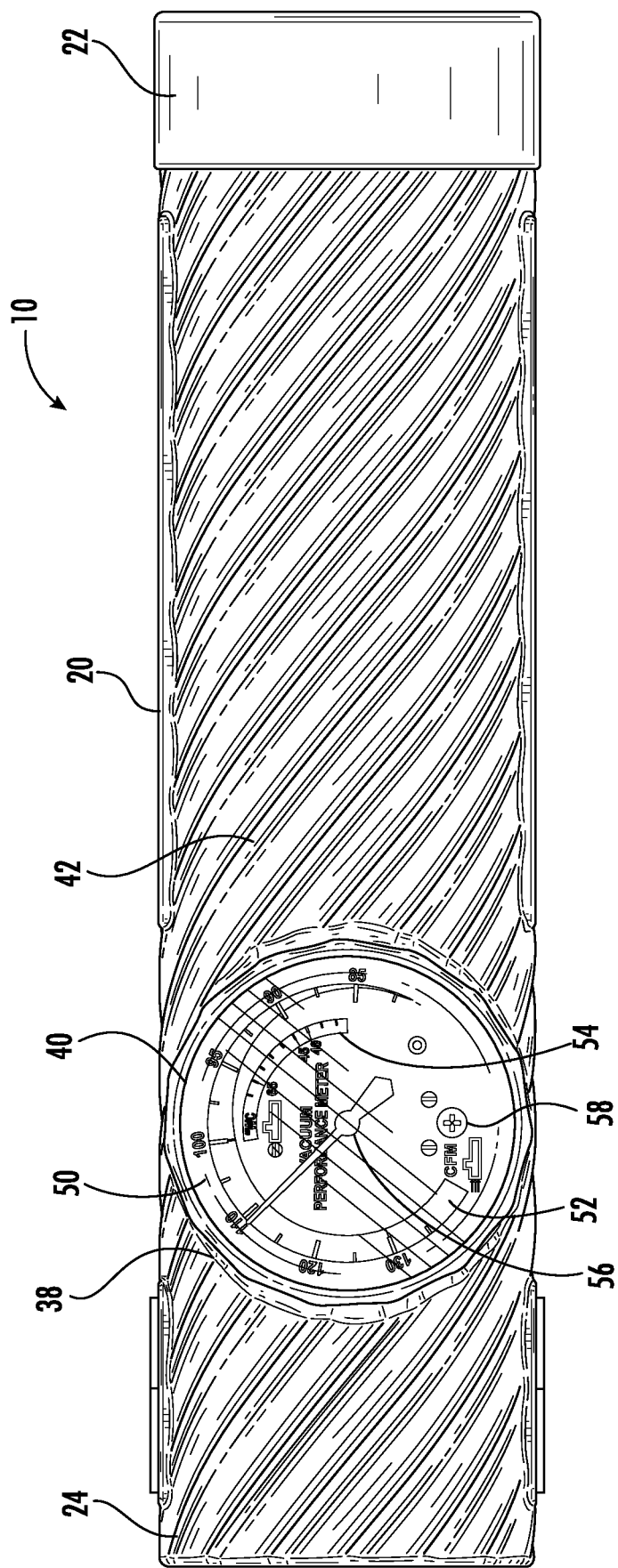
FIG. 9 is a top view of a flow meter of an embodiment showing the meters.

A flow meter 50 may be coupled to the cover 20. The flow meter 50 may fit within an opening 40 in an upstanding meter boss 38 that extends upward from the top surface of the cover 20. As shown in more detail in FIG. 9, the flow meter 50 may include a single meter or multiple gauges 52, 54, a pointer 56, and a calibration set screw 58. Alternatively, the output could conceivably be a digital output or transmitted to a mobile computing device of the user via a wireless signal transmission system such as a WIFI® or BLUETOOTH® connection. The flow meter 50 may include an attachment protrusion that couples to the meter connection boss 88 of the venturi insert 70. As shown, this connection is a screw 91 and thread 92 connection, but it should be known that the connection could be any connection known in the art to provide airflow typically sealed/leak-free airflow through the connection.

Figure 11:
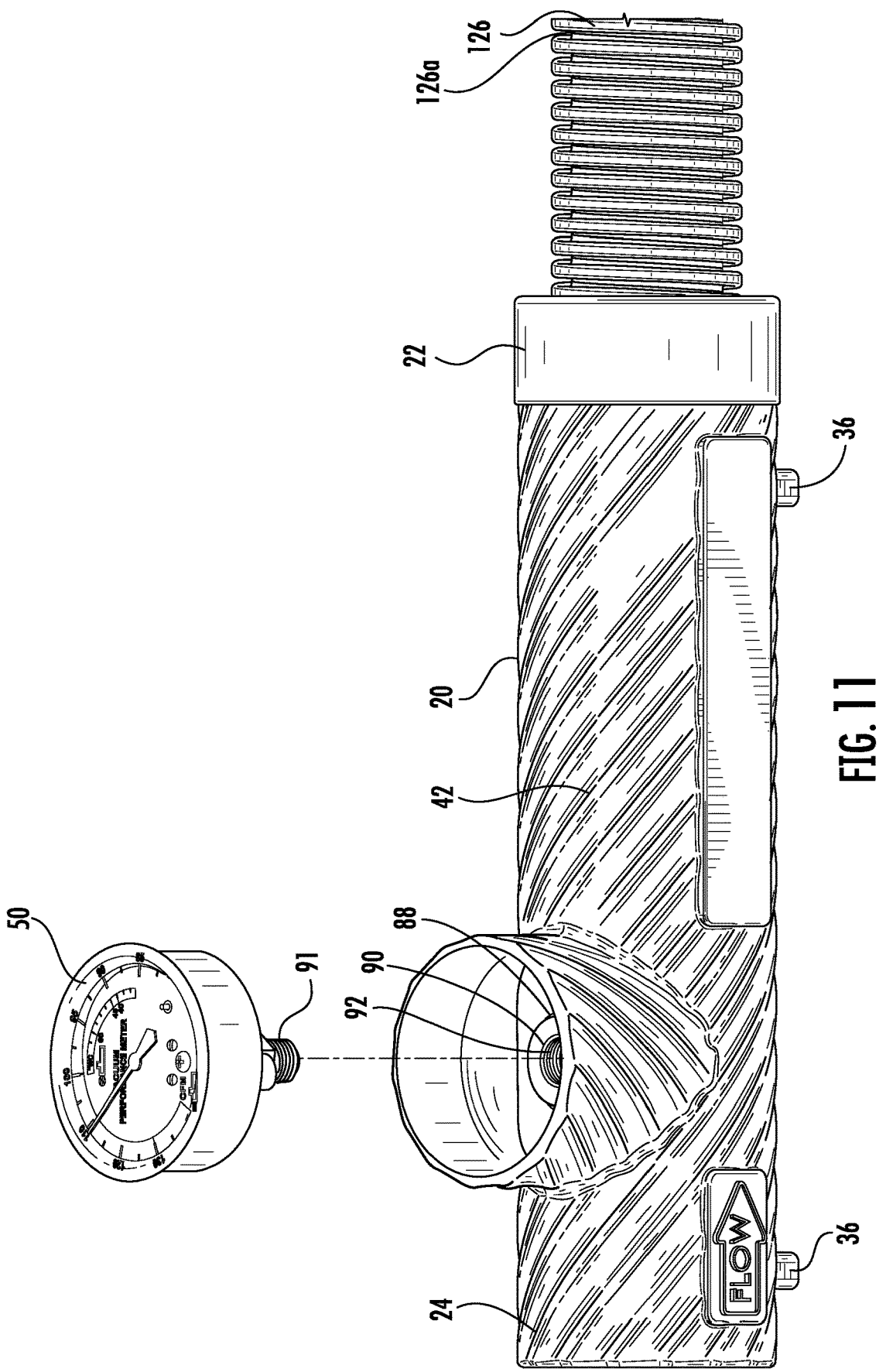
FIG. 11 is a partial exploded view of the flow meter shown in FIG. 10 showing the flow meter disengaged from the overall housing of the flow meter of the present disclosure where it would be threadedly engaged with the venturi section internal to the flow meter when the flow meter is assembled.

The flow meter 50 may be placed into the opening 40 of the upstanding meter boss 38, and a bottom portion of the meter assembly may contact the meter connection boss 88 of the venturi insert 70. As shown, in at least FIGS. 8 and 11, the flow meter 50 may then be rotated and screwed into the opening 90 in the meter connection boss 88. The bottom of the flow meter may be open to atmosphere within the venturi insert 70 in order to sense the pressure within the venturi section 82 of the venturi insert 70 when in use.

In use, a user may attach the overall flow meter assembly 10 to a vacuum hose 126 by threading the male threads 26a on the interior surface of the cover at the end 26 to the threads 126a of an airflow hose that is part of the overall vacuum assembly. By using the threads typically already present on the vacuum hose, the user can attach the flow meter to the vacuum hose by hand and without the use of tools and without the use of any sealing O-ring, clamp, or other force applying structure applied to the exterior surface 42 of the cover to adequately seal the flow meter assembly into engagement and measure airflow speed therethrough. Once a good fit, which is typically a substantially complete or more typically a complete airtight seal, has been obtained, at least two different readings can be taken by the user.

The first reading that can be made is done by leaving the opening 28 unobstructed. When this is done the user can get an accurate measurement of the total flow of air through the hose 126. The flow meter 50 senses the static pressure of the volumetric airflow through the venturi insert 70 at the venturi section 82 and moves the pointer 56 with respect to the outer meter 52, which may be calibrated to show airflow in cubic feet per minute (CFM). While technically this is still a static pressure reading, it is henceforth referred to as a dynamic pressure reading because the reading is taken of a volume of moving air.

The outer meter 52 may helpfully be color coded so that e.g. 100-130 CFM is green, 100-95 CFM and above 130 CFM is yellow, and below 95 CFM is red. Typically, 100-130 CFM offers users of the vacuum enough suction to clean small debris off of vehicle carpet and other areas, while not wasting energy that would be used to create more than 130 CFM suction. If the vacuum hose airflow is less than 100 CFM, degradation in performance begins to be noticeable to the user.

The second reading that may be taken by the user is a static pressure reading. The user may put their hand or other sealing object such as a flexible silicon covering or other airtight sealing material over the opening 28, removing the flow of air through the hose 126 and through the venturi insert 70. By stopping the air inside the venturi insert 70, the flow meter 50 reads the static pressure at the hose. The inner gauge 54 may show a pressure reading in inches of water ("WC).

The inner gauge 54 may helpfully be color coded so that e.g. 45-65"WC is green, 40-45 and above 65"WC is yellow, and below 40"WC is red. Typically, 45-65"WC offers users of the vacuum enough suction to clean small debris off of vehicle carpet and other areas, while not wasting energy that would be used to create more than 65"WC suction. If the vacuum hose airflow is less than 40"WC, degradation in performance begins to be noticeable to the user. Generally, the static and dynamic reading correlate well, but there may be some differences that cause the user to look into certain issues.

Using the flow meter assembly of the present disclosure, a user may quickly and efficiently test the performance of a vacuum system at a vehicle wash facility and measure actual airflow strength at a given location at a vehicle vacuuming location of a vehicle washing and/or vacuuming facility. Vehicle washing facilities typically include one or more vacuum systems so that customers of the car wash can also clean the inside of their car often before or after washing the outside of their vehicle. Sometimes the systems are canister systems and sometimes the systems are remotely located from the air intake hoses used by users to vacuum a vehicle. When a canister vacuum system is being tested, the vacuum system may service only one or two vehicles at the same time. However, the larger centralized systems often employ 6 or more independent vehicle vacuuming locations. Regardless, the vacuum system typically has at least two vehicle parking stalls located adjacent to the vacuum system so that the customer whose vehicle is parked in the vacuum stall may easily access the vacuum hose and be able to reach the hose anywhere in the interior of their vehicle. The vacuum system itself will typically include an arch to hang the vacuum hose from which is held up by a support pole, and the hose can optionally pass through the arch and through the support pole. The arch is at an elevated position above most vehicles, such that the hose can be manipulated easily, further facilitating the customer's easy access to all portions of the interior of their vehicle with the vacuum nozzle end. A hose that lays on the ground, for example, would be more difficult to use as the customer would have to drag the majority of the hose's weight around during use. The hose is also less prone to wear and tear while elevated as it will not rub against the ground. A hanging hose eliminates these problems. The vacuum system will also typically include a debris separator which can collect items the customer may not want to lose like their keys or coins and can keep these and other items from going further into the system's hose and vacuum lines, potentially damaging equipment in the facility overall. Each of the vacuum hoses passes through a debris separator, before it is connected to a main vacuum line or duct. The main line or duct is connected to an electric vacuum motor, which provides adequate suction power to each of the vacuum systems. The motor systems for a centralized vacuuming system is typically located inside of a building at the facility with a main hose line extending to each of the individual vacuum service hoses at each vehicle treatment location at the vacuuming facility.

To detect issues and to measure the performance at a car wash facility, a user can easily and quickly test each vacuum hose within the car wash facility using a flow meter assembly of the present disclosure. A user simply screws a particular vacuum hose inlet into the downstream end of the flow meter, activates the vacuum and checks the dynamic pressure and/or static pressure from the meter assembly. A hose that is not displaying the desired pressure may be getting too much suction or too little. If a certain hose is not getting proper suction, a user may quickly test surrounding hoses to see if the issue is limited to that particular hose. Similarly, if all hoses past a certain point along the main vacuum line are all having issues, this allows the user to quickly and efficiently pinpoint a trouble spot within the vacuum lines or ducts. Similarly, if less than all or none of the vacuum hoses are getting proper suction or most hoses are not, it could indicate a problem with the vacuum motor. It may also help designers in determining proper duct sizes along a particularly long vacuum line by ensuring every hose along the line is getting good suction.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. An air pressure-based flow meter assembly for a vacuum hose of a vehicle vacuuming system capable of measuring static pressure and dynamic pressure comprising:
   a cover having an upstream end with an upstream cover opening and a downstream end with a downstream cover opening;

a venturi insert disposed within and coupled to the cover, the venturi insert comprising a venturi upstream end and a venturi downstream end, a nozzle portion adjacent the venturi upstream end, a diffuser portion adjacent the venturi downstream end, and a venturi portion between the nozzle portion and the diffuser portion; and a flow meter engaged with the cover and attached to the venturi portion of the venturi insert such that the flow meter is in airflow contact with the venturi portion, the flow meter comprising an airflow rate scale, a static pressure scale, and a pressure sensor;

wherein the flow meter displays an airflow rate by sensing the dynamic pressure through the venturi portion when airflow is urged through the venturi insert; and wherein the flow meter displays a static pressure reading by sensing the static pressure within the venturi insert when the upstream end of the cover is closed.

2. The air pressure-based flow meter assembly of claim 1, wherein the cover further comprises an upstanding meter boss and the flow meter is coupled to the cover and spaced within the upstanding meter boss and wherein the flow meter is engaged to the venturi insert via a threaded connection between a downwardly extending projection of the flow meter and an upwardly extending threaded boss on a top surface of the venturi insert.

3. The air pressure-based flow meter assembly of claim 2, wherein the venturi insert is substantially concentric with a center of the upstream cover opening and the downstream cover opening and wherein the venturi insert further comprises a venturi insert upstream end opening and a venturi insert downstream end opening and wherein the venturi insert upstream end opening and the venturi insert downstream end opening have the same cross-sectional size; and wherein the diffuser portion of the venturi insert has a cross-sectional area that gradually increases from a location proximate the nozzle portion and downstream of a meter connection boss of the venturi insert to the downstream end of the venturi insert.

4. The air pressure-based flow meter assembly of claim 1, wherein the venturi insert is substantially concentric with a center of the upstream cover opening and the downstream cover opening and wherein the cover and the venturi insert are unitary components and wherein the flow meter is in direct engagement with the venturi insert.

5. The air pressure-based flow meter assembly of claim 4, wherein the venturi insert further comprises a meter connection boss extending upwardly from the venturi insert and defining a meter opening that directly engages a downwardly extending air coupling of the flow meter.

6. The air pressure-based flow meter assembly of claim 5, wherein an interior surface of the downstream end of the cover is threaded.

7. The air pressure-based flow meter assembly of claim 6, wherein the upstream end of the cover has a plurality of spaced apart venturi insert engaging protrusions on an interior facing surface of the upstream end and the venturi upstream end of the plurality of spaced apart venturi insert has a plurality of spaced apart cover attachment protrusions thereon that engage the plurality of spaced apart venturi insert engaging protrusions such that a line-to-line fit or an interference fit is created therebetween.

8. The air pressure-based flow meter assembly of claim 7, wherein the downstream end of the venturi insert has an externally facing surface that is cylindrically-shaped and sized to engage the interior surface of the downstream end of the cover such that little or no movement of the venturi insert is possible while the air pressure-based flow meter assembly is in use.

9. The air pressure-based flow meter assembly of claim 7, wherein the downstream end of the venturi insert has an externally facing surface that is frictionally engaged with the interior surface of the downstream end of the cover.

10. The air pressure-based flow meter assembly of claim 1, wherein the upstream end of the cover has a plurality of spaced apart venturi insert engaging protrusions on an interior facing surface of the upstream end and the venturi upstream end of the venturi insert has a plurality of spaced apart cover attachment protrusions thereon that engage the plurality of spaced apart venturi insert engaging protrusions such that a line-to-line fit or an interference fit is created therebetween.

11. The air pressure-based flow meter assembly of claim 1, wherein the venturi insert further comprises a meter connection boss extending upwardly from the venturi insert and defining a meter opening that threadingly engages a downwardly extending air coupling of the flow meter.

12. The air pressure-based flow meter assembly of claim 11, wherein the upstream end of the cover has an inwardly projecting lip with a plurality of spaced apart apertures therein and wherein an interior circumference of the inwardly projecting lip defines the upstream cover opening.

13. The air pressure-based flow meter assembly of claim 1, wherein the upstream end of the cover has an inwardly projecting lip with a plurality of spaced apart apertures therein and wherein an interior circumference of the inwardly projecting lip defines the upstream cover opening.

14. The air pressure-based flow meter assembly of claim 1, further comprising at least one leg on a bottom surface of the cover.

15. The air pressure-based flow meter assembly of claim 14, further comprising a first leg on a bottom side of the cover and a second leg on the bottom surface of the cover and spaced apart from the first leg and wherein the first leg is proximate the upstream end of the cover and the second leg is proximate the downstream end of the cover.

16. The air pressure-based flow meter assembly of claim 1, wherein the cover further comprises a visual indicator integrally formed into an exterior surface of the cover that displays to a user one or more pieces of information chosen from the group consisting of a direction of airflow through the air pressure-based flow meter assembly when properly used, date of manufacture information, a name of a manufacturer of the air pressure-based flow meter assembly, a direction for use, a QR Code or other machine readable code, and calibration information.

17. A method of determining performance characteristics of at least one vacuum hose of a vehicle vacuuming system comprising the steps of:

attaching an air pressure-based flow meter assembly of claim 1 to a first vehicle vacuuming hose; and performing one or more of the following steps for the first vehicle vacuuming hose:

activating a motor of the vehicle vacuuming system such that an airflow is established from an ambient environment around the air pressure-based flow meter assembly such that air flows in series through the venturi upstream end of the venturi insert, through the nozzle portion of the venturi insert, through the venturi portion of the venturi insert, and through the diffuser portion of the venturi insert and out the downstream opening of the flow meter;

using the flow meter in sensing the dynamic pressure of the air at the venturi portion using the pressure sensor to thereby obtain a sensed dynamic pressure;

displaying the airflow reading by translating the sensed dynamic pressure into the airflow reading on a visible meter assembly;

closing the upstream end of the cover;

sensing a static pressure of the air at the venturi portion using the pressure sensor to obtain a static pressure reading; and displaying the static pressure reading on the visible meter assembly.

18. The method of claim 17, wherein the step of attaching the flow meter to the first vehicle vacuuming hose further comprises the step of using a threaded vehicle vacuuming hose to engage a threaded surface on an interior facing surface of the downstream end of the flow meter and is engaged by hand and without the use of tools by a user.

19. The method of claim 17 further comprising the steps of:

detaching the air pressure-based flow meter assembly from engagement with the first vehicle vacuuming hose;

attaching the air pressure-based flow meter assembly to a second vehicle vacuuming hose; and performing one or more of the following steps for the second vehicle vacuuming hose:

activating the motor of the vehicle vacuuming system such that an airflow is established from the ambient environment such that air flows in series through the upstream end of the venturi insert, through the nozzle portion of the venturi insert, through the venturi portion of the venturi insert, and through the diffuser portion of the venturi insert and out the downstream opening of the flow meter;

using the flow meter in sensing the dynamic pressure of the air at the venturi portion using the pressure sensor to thereby obtain a sensed dynamic pressure; and displaying the airflow reading by translating the sensed dynamic pressure into the airflow reading on the visible meter assembly;

closing the upstream end of the flow meter; and sensing a static pressure of the air at the venturi portion using the pressure sensor to obtain a static pressure reading;

displaying the static pressure reading on the visible meter assembly;

detaching the air pressure-based flow meter assembly from engagement with the second vehicle vacuum hose;

attaching the air pressure-based flow meter assembly to a third vehicle vacuuming hose;

performing one or more of the following steps for the third vehicle vacuuming hose:

activating the motor of the vehicle vacuuming system such that an airflow is established from the ambient environment such that air flows in series through the upstream end of the venturi insert, through the nozzle portion of the venturi insert, through the venturi portion of the venturi insert, and through the diffuser portion of the venturi insert and out the downstream opening of the flow meter;

using the flow meter in sensing the dynamic pressure of the air at the venturi portion using the pressure sensor to thereby obtain a sensed dynamic pressure;

displaying the airflow reading by translating the sensed dynamic pressure into the airflow reading on the visible meter assembly;

closing the upstream end of the cover;

sensing a static pressure of the air at the venturi portion using the pressure sensor to obtain a static pressure reading; and displaying the static pressure reading on the visible meter assembly; and wherein the first vehicle vacuuming hose, the second vehicle vacuuming hose, and the third vehicle vacuuming hose are separate vehicle vacuuming hoses at the same overall vehicle vacuuming facility and wherein each of the first vehicle vacuuming hose, the second vehicle vacuuming hose and the third vehicle vacuuming hose correspond to a first vehicle vacuuming location, a second vehicle vacuuming location and a third vehicle vacuuming location within the same overall vehicle vacuuming facility.

20. An air pressure-based flow meter assembly comprising:

a cover having an upstream end with an upstream cover opening; a downstream end with a downstream cover opening; a first leg on a bottom surface of the cover; and a second leg on the bottom surface of the cover spaced apart from the first leg and wherein the first leg is proximate the upstream end of the cover and the second leg is proximate the downstream end of the cover;

a venturi insert disposed within and coupled to the cover, the venturi insert comprising a venturi upstream end and a venturi downstream end, a nozzle portion adjacent the venturi upstream end, a diffuser portion adjacent the venturi downstream end, and a venturi portion between the nozzle portion and the diffuser portion; and a flow meter engaged with the cover and attached to the venturi portion of the venturi insert such that the flow meter is in airflow communication with the venturi portion;

wherein the flow meter displays an airflow rate by sensing dynamic pressure through the venturi portion when airflow is urged through the venturi insert;

wherein the flow meter displays a static pressure reading by sensing the static pressure within the venturi insert when the upstream end of the cover is closed;

wherein the upstream end of the cover has a plurality of spaced apart venturi insert engaging protrusions on an interior facing surface of the upstream end and the venturi upstream end of the venturi insert has a plurality of spaced apart cover attachment protrusions thereon that engage the plurality of spaced apart venturi insert engaging protrusions such that a line-to-line fit or an interference fit is created therebetween;

wherein the cover further comprises an upstanding meter boss and the flow meter is coupled to the cover and spaced within the upstanding meter boss; and wherein the venturi insert is substantially concentric with a center of the upstream cover opening and the downstream cover opening and wherein the venturi insert further comprises a venturi insert upstream end opening and a venturi insert downstream end opening and wherein the venturi insert upstream end opening and the venturi insert downstream end opening have the same cross-sectional size.

* * * * *